May 31, 1932.  S. SCHNELL  1,860,959

BRAKE MECHANISM

Filed Sept. 24, 1930

Inventor
STEVE SCHNELL

By E. E. Huffman
Att'y

Patented May 31, 1932

1,860,959

UNITED STATES PATENT OFFICE

STEVE SCHNELL, OF ST. LOUIS, MISSOURI, ASSIGNOR TO WAGNER ELECTRIC CORPORATION, OF ST. LOUIS, MISSOURI, A CORPORATION OF DELAWARE

BRAKE MECHANISM

Application filed September 24, 1930. Serial No. 483,984.

My invention relates to brake mechanisms, its object being to secure simplification and reduction of cost without sacrifice of durability or efficiency and to provide improved means for adjusting the "off" position of the brake shoes to compensate for brake lining wear.

Figure 1:
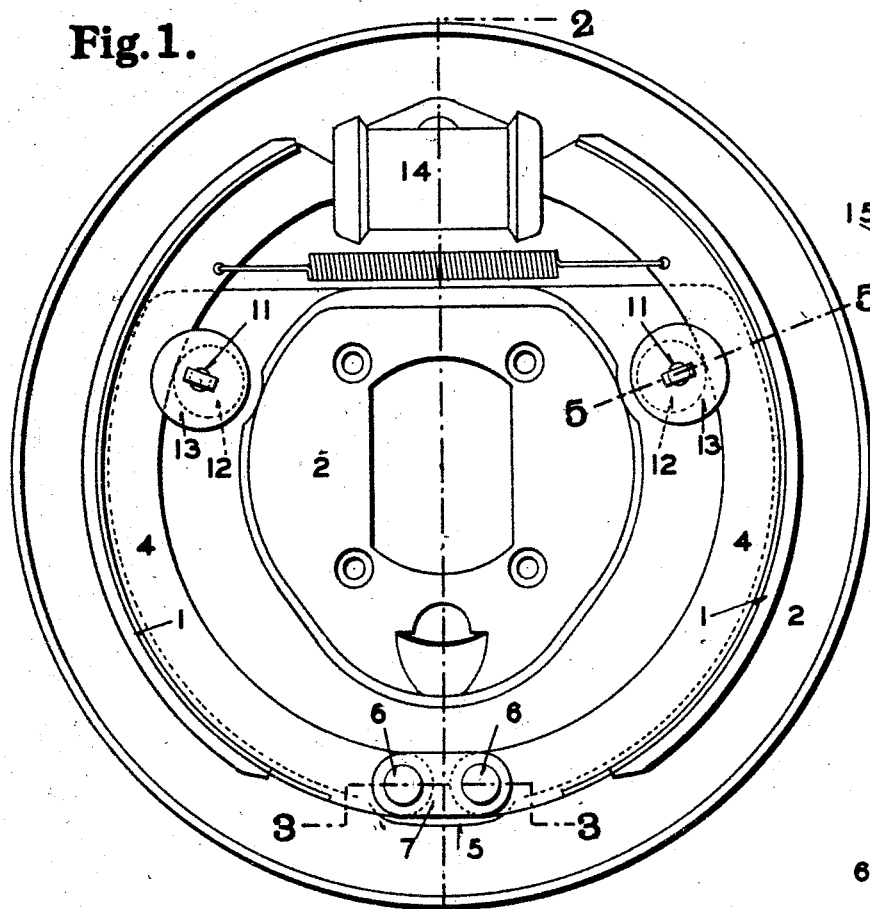
Figure 2:
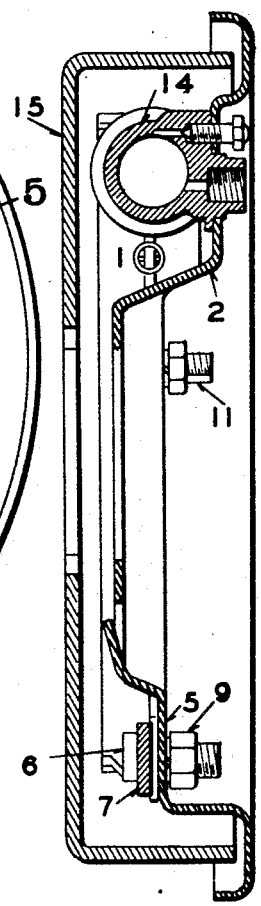
Figure 3:
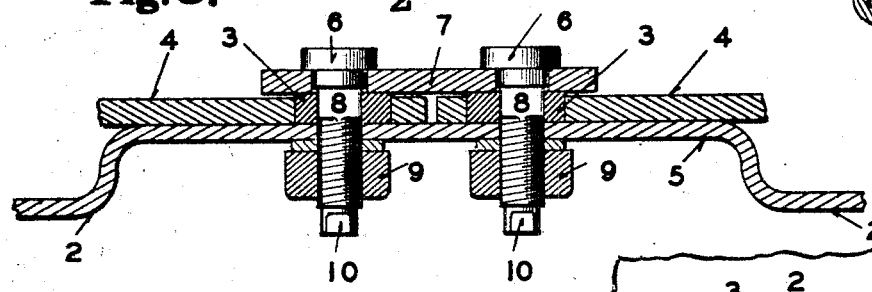
Figure 4:
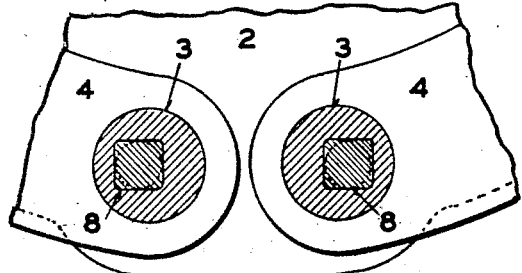

In the accompanying drawings Figure 1 is a side elevational view of braking apparatus embodying my invention (the brake drum being omitted); Figure 2 is a vertical cross sectional view on the line 2—2 of Figure 1 (the brake drum being also shown in cross section); Figure 3 is a cross sectional view of the shoes and supporting means taken along the line 3—3 of Figure 1; Figure 4 is a side elevation of the ends of the shoes and a portion of the backing plate, the shoe supporting pins being shown in section; and Figure 5 is a cross sectional view along the line 5—5 of Figure 1.

Figure 5:
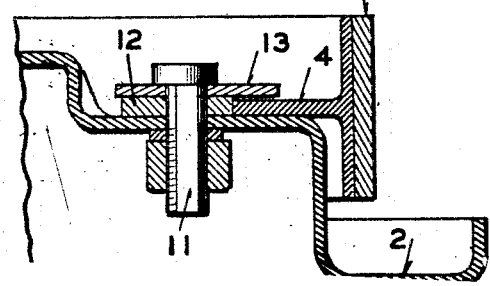

As indicated in Figures 2 and 5, the brake shoes 1 are T-shaped in cross section and are carried by a backing or supporting plate 2 by pivot means cooperating with their ends. These pivot means are illustrated more in detail in Figures 3 and 4 and comprise circular bearing collars 3 rotatively fitting in openings in the ends of the webs 4 of the shoes, and of slightly greater thickness than the webs. The backing plate is provided with a pressed-up portion 5 against which collars 3 are adapted to be clamped. This pressed-up portion lies adjacent to the webs of the shoes throughout the major portion of their length, as indicated in Figures 1 and 2, thus forming an abutment preventing lateral motion of the free ends of the shoes in one direction. The collars 3, which form bearings for the shoes, are held in position by pins 6 passing through the portion 5 of the backing plate, and preferably these pins also carry the plate 7 which constitutes means for laterally retaining the shoes on the collars.

The pins 6 are provided with square or angular portions 8 cooperating with eccentrically positioned angular openings in the collars 3 to establish non-rotative relation between the pins and collars. As the result of the eccentricity of the axes of the pins to the centers of the collars, the rotation of a pin in its opening in the backing plate 5 adjusts the position of the end of its shoe to produce the desired "off" position clearance between the brake lining and the drum 15. When the shoes are properly positioned the collars are firmly clamped between the backing plate 5 and the retainer plate 7, by drawing up nuts 9. For convenience in rotating the pins for the purposes of shoe adjustment, their ends are flattened as at 10.

As shown in Figures 1 and 5, adjustment stops are mounted on the backing plate near the forward ends of the shoes, these stops comprising the pin 11 eccentrically carrying the stop disk 12. These pins also carry the retainer disks 13 which extend over and abut the sides of the webs of the shoes opposite the backing plate and thereby lateral movement of the free ends of the shoes is prevented and twisting strain on the pivot bearings of the shoes, during brake application, is avoided. The structure described thus makes it possible to properly support the shoes on a narrow pivot bearing of not substantially greater width than the thickness of the webs of the shoes and renders unnecessary attachment of any part to the shoe web to form its pivot bearing, or reinforcement of the backing plate adjacent the pivots since it lies closely adjacent the line of thrust of the shoe. The collar 3 may be made of brass or other non-rusting material to avoid binding of the pivot joints and thus the necessity of applying separate bushing to the shoes is avoided.

While the drawings illustrate hydraulic shoe actuating means 14, it will be understood that my invention is not limited to any particular type of shoe actuating mechanism.

Having fully described my invention, what I claim as new and desire to secure by Letters Patent of the United States is:

1. A brake shoe mounting comprising a supporting plate, a shoe supporting pin carried by said plate, a shoe supporting collar separable from the pin and mounted eccentrically thereon and rotatable therewith, and releasable means for clamping said collar in non-rotative relation with said plate, said means comprising a retainer member carried by said pin and extending beyond the periphery of said collar to retain the shoe thereon.

2. In brake mechanism, a brake shoe substantially T-shaped in cross section, and a backing plate having a portion laterally abutting the web of the shoe throughout the major portion of its length and carrying a pivot support therefor.

3. In brake mechanism, a brake shoe substantially T-shaped in cross section, a backing plate having a portion laterally abutting the web of the shoe throughout the major portion of its length and carrying a pivot support therefor, and a retainer carried by the backing plate and positioned on the side of the web opposite said plate at a point removed from the shoe pivot whereby the retainer and backing plate cooperate to prevent lateral movement of the free end of the shoe.

4. A mounting for T-section brake shoe comprising a supporting plate having a portion abutting the web of the shoe and carrying a rotatable anchor pin, a bearing collar separable from the pin and eccentrically mounted thereon to rotate therewith and extending through and rotatively supporting the web of the shoe, a shoe retaining element carried by the pin and bearing on the side of said collar opposite the supporting plate, and means including said pin for clamping the bearing collar between the plate and shoe retainer to maintain it in a selected one of its rotative positions.

5. Brake mechanism comprising a drum and a T-section brake shoe cooperating therewith, a closure plate for the drum having a depressed portion abutting the web of the brake shoe at one end and throughout a substantial portion of its length, a pivot pin extending through the closure plate and the web of the shoe and carrying a bearing disk on which said web is mounted, said disk having a width only slightly greater than the thickness of said web, and a shoe retainer element on said pin maintaining the shoe on the bearing.

In testimony whereof, I hereunto affix my signature, this 18th day of September, 1930.

STEVE SCHNELL.